United States Patent [19]

Takagi et al.

[11] Patent Number: 4,743,121
[45] Date of Patent: May 10, 1988

[54] CLINICAL ELECTROTHERMOMETER

[75] Inventors: Tatsuo Takagi; Toshiaki Takagi, both of Fujinomiya, Japan

[73] Assignee: Terumo Kabushiki Kaisha, Tokyo, Japan

[21] Appl. No.: 935,617

[22] Filed: Dec. 2, 1986

Related U.S. Application Data

[63] Continuation of Ser. No. 763,471, Aug. 7, 1985, abandoned.

[30] Foreign Application Priority Data

Aug. 13, 1984 [JP] Japan ............... 59-169088

[51] Int. Cl.$^4$ .......... G01K 7/00; G01K 1/00
[52] U.S. Cl. ............... 374/163; 374/208; 264/250; 264/271.1; 264/328.8
[58] Field of Search ........... 374/208, 209, 163, 170, 374/183, 188; 206/306, 811; 264/250, 271.1, 275, 278, 328.7, 328.8

[56] References Cited

U.S. PATENT DOCUMENTS

| 3,490,287 | 1/1970 | Coben | 374/194 |
|---|---|---|---|
| 3,719,735 | 3/1973 | Valyi | 264/250 |
| 3,809,229 | 5/1974 | Wahlig | 374/194 |
| 4,044,614 | 8/1977 | Beckman | 374/208 |
| 4,108,002 | 8/1978 | Rowe et al. | 374/208 |
| 4,321,029 | 3/1982 | Aoki | 425/523 |
| 4,444,517 | 4/1984 | Murase | 374/208 |
| 4,492,548 | 1/1985 | Hubert | 425/523 |
| 4,495,125 | 1/1985 | Hatakeyama et al. | 264/250 |
| 4,507,258 | 3/1985 | Aoki | 425/523 |
| 4,565,456 | 1/1986 | Iida et al. | 374/170 |
| 4,579,464 | 4/1986 | Yamazaki et al. | 4/208 |

FOREIGN PATENT DOCUMENTS 59-87639 6/1984 Japan .
2108890 5/1983 United Kingdom .

OTHER PUBLICATIONS

Patents Abstracts of Japan, vol. 8, No. 242 (p. 311) [1679], Nov. 7, 1984; JP-A-59 116 519 (Kiyuushiyuu Hitachi Makuseru K.K.) 5/7/84.
Patents Abstracts of Japan, vol. 10, No. 84 (p. 442) [2141], Apr. 3, 1986; JP-A-60 219 526 (Terumo K.K.) 2/11/85.

Primary Examiner—William A. Cuchlinski, Jr.
Assistant Examiner—Patrick R. Scanlon
Attorney, Agent, or Firm—Frishauf, Holtz, Goodman & Woodward

[57] ABSTRACT

A clinical electrothermometer is provided with an elongated casing having a tapered extension, a temperature-sensing probe element mounted to the tip of the extension, an electronic circuit connected to the probe element and including a display for displaying the sensed temperature, and a battery for supplying electrical power to the circuit. The casing is integrally formed from a window member of a transparent synthetic resin including a window portion facing the display and a body member of an opaque synthetic resin, by joining the members into a distinctive, but one-piece unit by multi-color injection molding.

7 Claims, 2 Drawing Sheets

CLINICAL ELECTROTHERMOMETER

This application is a continuation of application Ser. No. 763,471, filed 8/7/85 and now abandoned.

BACKGROUND OF THE INVENTION

This invention relates to a clinical electrothermometer for electronically detecting and digitally displaying a body temperature which is sized substantially equal to flat type clinical thermometers and has a waterproof casing structure.

A typical clinical electrothermometer comprises a temperature-sensing element for converting temperature information into electric signals, computing and display means for converting the electric signals into digital signals, computing the signals, and displaying the determined temperature, and a battery for supplying a power to these components. All the elements are housed in an elongated casing. A recent technical advance in the miniaturization of LSI's and other electronic circuit elements allows clinical electrothermometers to be manufactured in small size.

When such clinical electrothermometers are used in a hospital, infections among patients by way of a clinical electrothermometer must be prevented. For this purpose, the outer surface of the clinical electrothermometer is subjected to disinfection as by cleaning and rinsing. Most conventional electrothermometers, however, have a structure unsuitable for such disinfection.

In this type of clinical electrothermometer, a transparent display window must be provided in the casing which houses the computing and display means therein so that the temperature display may be viewed from the exterior. To this end, the casing is formed with an opening, which constitutes an obstacle in providing a waterproof structure.

A transparent window member may be fitted in an opening in the casing with adhesive to provide an adhesive seal for attaining a waterproof structure. However, such electrothermometers are difficult to mass produce in a consistent manner.

A transparent window member may also be secured to an opening in the casing by means of a packing and a screw. In this case, more parts are used to constitute the casing. Such a complicated structure is a bar against mass productivity as well as miniaturization.

Clinical electrothermometers of battery-replacing type have similar problems as mentioned above. A cover to be removably mounted for battery replacement is less waterproof at its mount and difficult to mass produce in a consistent manner.

To impart waterproofness to clinical electrothermometers, waterproof coatings may be applied onto the display window and cover portions. Such coatings must be transparent so as not to damage the function and appearance of the display window. A coating layer of transparent resin over the window portion may impart a sufficient waterproofness to the clinical electrothermometer, and the response of the probe to temperature is not retarded when a thin coating layer is employed.

However, heat must be applied in a drying step for the removal of the solvent when such a transparent resin is applied on the window portion in a usual manner. Conventional electrothermometers are heat resistant only up to about 60° C. in consideration of the protection of electronic elements. Thus heat drying cannot be employed in the manufacture of electrothermometers.

Resins capable of drying at relatively low temperatures such as ultraviolet-curable resins may be employed for the coating layer. However, there still remains a risk that electronic elements housed in the casing could be destroyed by heat from an ultraviolet lamp.

Room temperature vulcanizable silicone resins and rubbers may also be employed, but they take a long time until cured.

Since thermometers are often rubbed on the outer surface, for example, during cleansing, ordinary resins are insufficient in film strength and bond strength.

There are known few clinical electrothermometers which include a temperature-sensing element and display means combined and have a small-sized waterproof casing structure.

Japanese Utility Model Application Kokai No. 59-87639 discloses a clinical electrothermometer in which waterproofness is contrived by placing an O-ring of a synthetic rubber at the joint between the transparent window member and the opaque cylindrical casing. However, when such electrothermometers are mass produced, O-rings are often moved out of place allowing water and disinfectants to penetrate.

SUMMARY OF THE INVENTION

It is an object of the present invention to provide a clinical electrothermometer having a waterproof casing structure in which fluid penetration through the joint between a window member and a casing is prevented by joining these components into a one-piece unit by a multi-color molding process.

This and other objects can be attained by the present invention as described below.

The present invention is directed to a clinical electrothermometer comprising an elongated casing having a tapered extension at one end, a probe element mounted to the tip of the extension for sensing a temperature, electronic circuit means electrically connected to the probe element and including display means for displaying the sensed temperature, and a battery for supplying electrical power to the circuit means. The circuit means and the battery are housed in the casing. According to the feature of the present invention, the casing comprises a window member of a transparent synthetic resin including a window portion facing the display means, and a body member of an opaque synthetic resin. The window member and the body member are joined into a distinctive, but one-piece unit by multi-color injection molding.

BRIEF DESCRIPTION OF THE DRAWINGS

The invention will be more fully understood when taken in conjunction with the accompanying drawings, in which.

DETAILED DESCRIPTION OF THE INVENTION

Referring to FIGS. 1 to 4, there is illustrated a clinical electrothermometer according to one preferred embodiment of the present invention.

Figure 1:
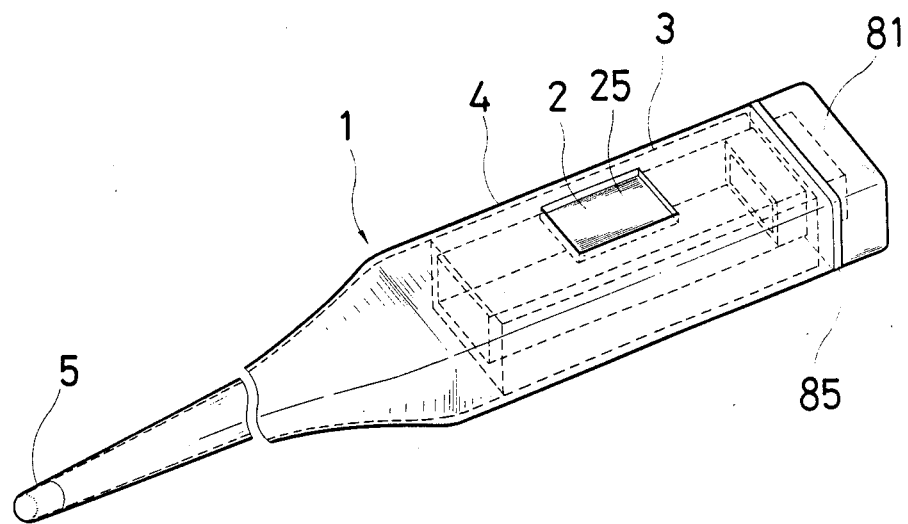
FIG. 1 is a perspective view of a clinical electrothermometer according to one embodiment of the invention.

FIG. 1 is a perspective view of a clinical electrothermometer 1 having an elongated casing 4. The casing 4 comprises a window member 2 of a transparent synthetic resin and a body member 3 of an opaque synthetic resin. The window member is hollow and columnar in the illustrated embodiment. The window member 2 is covered on the outer surface with the body member of opaque synthetic resin except a display window 25.

The casing 4 has a tapered extension at one end. On the tip of the extension is mounted a probe element 5 for sensing a body temperature. The other or rear end of casing 4 is connected to a rear cap 81 through a battery holder 85.

Figure 2:
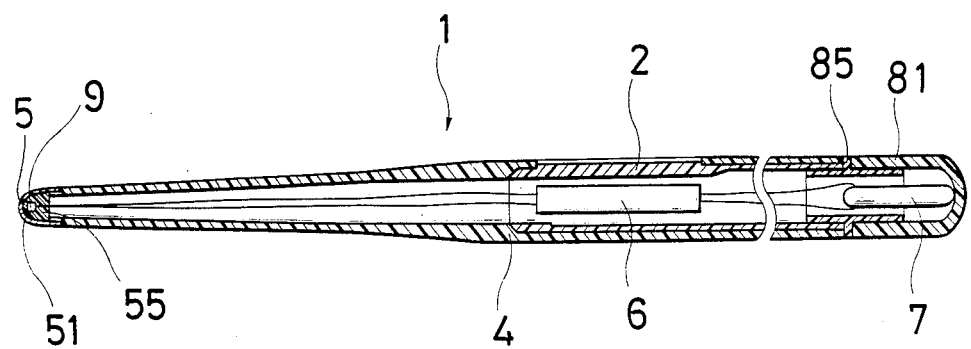
FIG. 2 is a longitudinal cross-section of the clinical electrothermometer of FIG. 1.

More illustratively, the probe element 5 of the electrothermometer 1 includes a temperature-sensing element 9 such as a thermistor for converting temperature information into electric signals and a probe cap 51 affixed to the tip of the casing extension for protecting the temperature-sensing element 9 as shown in FIG. 2. The probe cap 51 is made from a metal such as stainless steel, aluminum or the like. A potting material 55 is filled in a space defined by the temperature-sensing element 9, the probe cap 51 and the tip portion of the casing 4.

The temperature-sensing element 9 is electrically connected to electronic circuit means 6 which is driven by a battery 7. The electronic circuit means 6 includes display means for displaying the sensed temperature. The electronic circuit means 6 functions to convert electric signals from the temperature-sensing element 9 into digital signals, compute the signals, and display the determined temperature. The measuring/computing circuit used herein for the electronic circuit means 6 may be selected from conventional measuring/computing circuits of direct reading and extrapolation types. The electronic circuit means 6 and the battery 7 are housed in the elongated casing 4. Any suitable switch, for example, a magnet reed relay may be inserted between the computing/display means 6 and the battery 7.

The battery 7 is housed in the rear portion of the casing 5. More illustratively, the battery 7 is received in a battery holder 85, which is bonded to a rear cap 81 and the rear portion of the casing 4 with adhesive. Ultrasonic welding may be performed depending on the combination of synthetic resins.

Examples of the opaque or colored resins which can be used in molding the body member 3, rear cap 81 and battery holder 85 include polyethers such as polyphenylene oxide, etc.; polyesters such as polyethylene terephthalate, polybutylene terephthalate, etc.; polyacetals; acrylic resins such as polymethylmethacrylate, etc.; polystyrenes such as high-impact polystyrenes, ABS resins, etc.; polyolefins such as poly-2-methylpentene, polypropylene, etc.; polycarbonates; and the like.

Examples of the transparent synthetic resins which can be used in molding the window member 2 include styrene resins such as polystyrenes, butadiene-styrene copolymers, etc.; polyolefins such as poly-2-methylpentene, polypropylene, etc.; acrylic resins such as polymethylmethacrylate and the like; cellulose esters such as cellulose acetate, etc.; polyesters such as polyethylene terephthalate; and other well-known transparent resins.

According to the invention, the window member 2 and the body member 3 must be joined such that the body member 3 makes a liquid-tight engagement with the display window 25 of the window member 2. Then the window member 2 may be a plate instead of the columnar member as previously mentioned. The window member 2 and body member 3 are joined into a one-piece unit by two-color injection molding as will be described below. In this case, a columnar window member 2 is preferred because a wider contact area is available between the columnar window member 2 and the body member 3 than with a plate-like window member, providing enhanced waterproofness.

Figure 3:
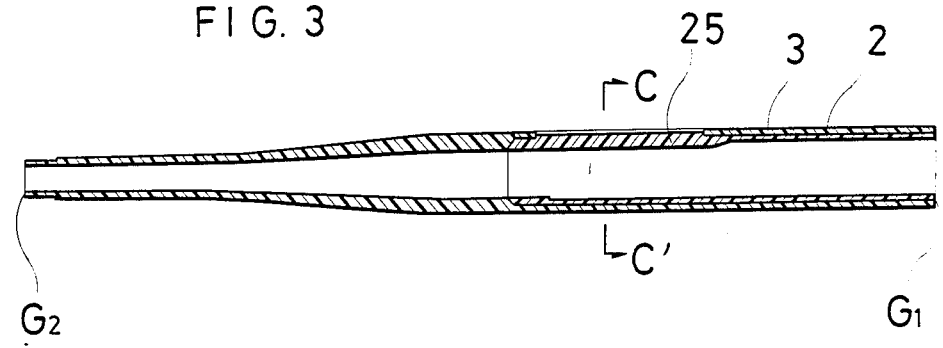
FIG. 3 is a longitudinal cross-section of the casing of the clinical electrothermometer of FIG. 2 at the end of molding.
Figure 4:
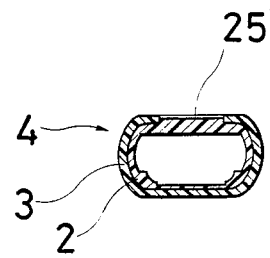
FIG. 4 is a radial sectional view of the thermometer taken along lines C—C' in FIG. 3.

As shown in FIGS. 2 to 4, the display window portion 25 facing the display means may preferably be raised beyond the outer surface of the columnar window member 2. A step-wise engagement is thus formed on the periphery of the display window, ensuring distinctive joining of the transparent window member 2 and the opaque body member 3.

The casing 4 may be formed by a multi-color injection molding machine, particularly by a two-color injection molding machine. First, the columnar window member 2 is molded and the body member 3 is then molded to cover the outer surface of the window member 2. A liquid-tight contact is thus achieved between the window member 2 and the body member 3 to prevent fluid penetration.

Figure 5:
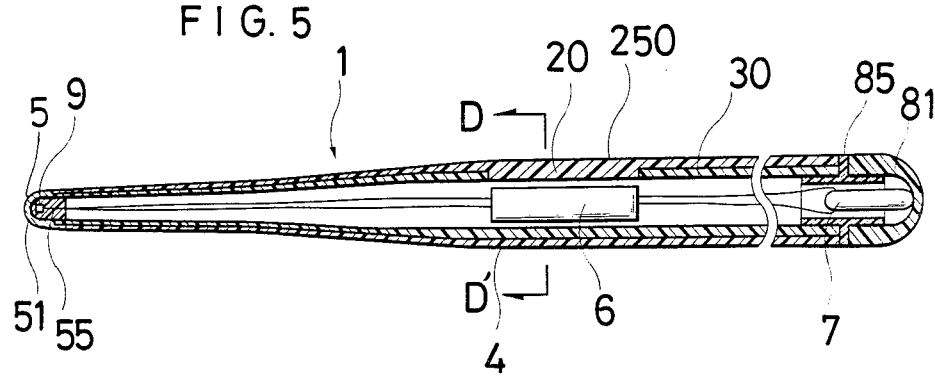
FIG. 5 is a longitudinal cross-section of a clinical electrothermometer according to another embodiment of the invention.
Figure 6:
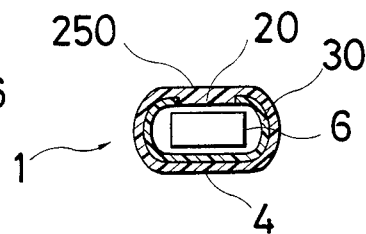
FIG. 6 is a radial cross-section of the thermometer taken along lines D—D' in FIG. 5.

Referring to FIGS. 5 and 6, there is shown in longitudinal cross-section another embodiment of the clinical electrothermometer of the invention.

The casing 4 of the clinical electrothermometer comprises a window member 20 of a transparent synthetic resin and a body member 30 of an opaque synthetic resin. The window member 20 includes a window portion 250 facing the display means of the electronic circuit means 6. The body member 30 made of an opaque resin such as polyphenylene oxide is a columnar member having an opening aligned with the window portion 250. The window member 20 of a transparent resin such as polystyrene liquid-tightly covers the outer surface of the body member 30.

Next, the process for manufacturing the clinical electrothermometer according to the invention will be described in detail with regard to the thermometer shown in FIGS. 1 to 4.

A primary injection molding machine has a mold including a cavity of a shape corresponding to the outer wall of the window member 2 and a core of a shape corresponding to the inner wall of the casing 4. Any suitable transparent synthetic resin compound as previously mentioned is injected into the mold cavity of the primary injection molding machine. The resulting window member 2 together with the core is taken out of the cavity and turned toward a secondary injection molding machine.

The secondary injection molding machine has a mold defining a cavity of a shape corresponding to the outer surface of the body member 3. The core having the transparent window member molded thereon is inserted into the cavity, and a suitable opaque synthetic resin compound is then injected into the cavity. The injected opaque resin intimately contacts or adheres to the window member except the window portion 25. The window member is thus tightly joined with the body member to form a distinctive, but one-piece casing. That is, the window member is integrated with the body member into a unit, but appears distinctive from the latter. The thus integrally molded casing 4 is moved out of the cavity together with the core and the core is then removed, obtaining the casing 4 consisting of the window member 2 and the body member 3 mutually integrated.

FIG. 3 shows the casing molded in this way, and FIG. 4 shows a cross-section taken along lines C—C' in FIG. 3. G1 and G2 respectively designate positions corresponding to primary and secondary gates used in the primary and secondary molding machines.

In the clinical electrothermometer according to the present invention, a waterproof tightly engaged joint is achieved between the window member and the body member by joining these members into a distinctive, but one-piece unit by multi-color injection molding without dimensional distortion between the peripheral edges of the display window and the body member. Fluid penetration during washing and sterilizing is eliminated so that the thermometer can be easily disinfected. The electrothermometer is thus highly durable and shock resistant, as well as presenting a good appearance due to a smooth joint between the peripheral edges of the window portion and the body member. These advantages are enhanced particularly when the casing is formed from coaxial columnar window and body members.

Further, the process for manufacturing the present clinical electrothermometer is simple and suitable for mass production.

DESCRIPTION OF PREFERRED EMBODIMENT

Examples of the present invention are presented below by way of illustration and not by way of limitation.

The clinical electrothermometers shown in FIGS. 1-4 and FIGS. 5 and 6 were manufactured as follows.

The clinical electrothermometer of FIGS. 1-4 has a body member 3 of an opaque synthetic resin and a window member 2 of a transparent synthetic resin covered on the outer surface with the body member except the window portion 25.

The clinical electrothermometer of FIGS. 5 and 6 has a body member 30 of an opaque synthetic resin and a window member 20 of a transparent synthetic resin covering the outer surface of the body member 30. The particular resins used for the body member and the window member are listed in Table 1.

The rear cap 81 and the battery holder 85 were made from opaque resins and the probe cap 51 made from stainless steel.

TABLE 1

| Sample No. | Opaque Synthetic Resin | Transparent Synthetic Resin |
|---|---|---|
| 1 | high-impact polystyrene | styrene-butadiene copolymer |
| 2 | polyphenylene oxide | poly-2-methylpentene |
| 3 | polymethyl methacrylate | polyethylene terephthalate |
| 4 | polycarbonate | cellulose acetate |
| 5 | polyacetal | polycarbonate |
| 6 | ABS resin | polymethyl methacrylate |
| 7 | polyphenylene oxide | polystyrene |

TABLE 1-continued

| Sample No. | Opaque Synthetic Resin | Transparent Synthetic Resin |
|---|---|---|

The thermometer samples were immersed in water to a depth of 1 m for 20 minutes. No bubble generation or clouding of the display window was observed in these samples.

The results of the examples show that the clinical electrothermometers of the present invention exhibit improved waterproofness and durability.

What is claimed is:

1. A clinical electrothermometer, comprising:
   an elongated casing having a tapered extension at one end,
   a probe element mounted to the tip of said extension for sensing a temperature,
   electronic circuit means electrically connected to said probe element and including display means for displaying the sensed temperature, and
   a battery for supplying electrical power to said circuit means, said circuit means and said battery being housed in said casing,
   wherein said casing comprises:
   an elongate window member of a transparent synthetic resin including a contacting surface portion, and a window portion facing said display means, said transparent resin being selected from the group consisting of a styrene resin, polyolefin resin, acrylic resin, cellulose ester resin, and polyester resin, and
   an elongate body member of an opaque synthetic resin fusible to the contacting surface portion of said window member,
   said window member, except for the window portion, and said body member being joined together into a distinctive, one-piece and liquid-tight unit by multi-color injection molding,
   said body member and said window member together forming said casing, wherein the contacting surface portion of said window member coextends with and is fused to a substantial surface area portion of said body member.

2. The clinical electrothermometer of claim 1 wherein said window member is formed of a butadiene-styrene copolymer and said body member is formed of a high impact polystyrene.

3. The clinical electrothermometer of claim 1, wherein said opaque synthetic resin forming said body member is selected from the group consisting of a polyether resin, polyester resin, polyacetal resin, acrylic resin, polystyrene resin, polyolefin resin, and polycarbonate resin.

4. The clinical electrothermometer of claim 1, wherein the transparent synthetic resin forming said window member is a styrene resin selected from the group consisting of polystyrenes and butadiene-styrene copolymers.

5. The clinical electrothermometer of claim 1, wherein the opaque synthetic resin forming said body member is selected from the group consisting of polyacetal, high-impact polystyrenes and ABS resins.

6. A clinical electrothermometer, comprising:
   an elongated casing having a tapered extension at one end, a probe element mounted to the tip of said extension for sensing a temperature, electronic circuit means electrically connected to said probe element and including display means for displaying the sensed temperature, and a battery for supplying electrical power to said circuit means, said circuit means and said battery being housed in said casing, wherein said casing comprises:

an elongate window member of a transparent synthetic resin including a contacting surface portion, and a window portion facing said display means, said transparent resin being selected from the group consisting of a styrene resin, polyolefin resin, acrylic resin, cellulose ester resin, and polyester resin, and an elongate body member of an opaque synthetic resin fusible to the contacting surface portion of said window member, said window member, except for the window portion, and said body member being joined together into a distinctive, one-piece and liquid-tight unit by multi-color injection molding, said body member and said window member together forming said casing, wherein the contacting surface portion of said window member coextends with and is fused to a substantial surface area portion of said body member, said window member is columnar, the window portion is raised beyond the outer surface of the contacting surface portion of said window member, and said window member is covered on its outer surface with said body member, except for said window portion.

7. A clinical electrothermometer, comprising:

an elongated casing having a tapered extension at one end, a probe element mounted to the tip of said extension for sensing a temperature, electronic circuit means electrically connected to said probe element and including display means for displaying the sensed temperature, and a battery for supplying electrical power to said circuit means, said circuit means and said battery being housed in said casing, wherein said casing comprises:

an elongate window member of a transparent synthetic resin including a contacting surface portion, and a window portion facing said display means, said transparent resin being selected from the group consisting of a styrene resin, polyolefin resin, acrylic resin, cellulose ester resin, and polyester resin, and an elongate body member of an opaque synthetic resin fusible to the contacting surface portion of said window member, said window member, except for the window portion, and said body member being joined together into a distinctive, one-piece and liquid-tight unit by multi-color injection molding, said body member and said window member together forming said casing, wherein the contacting surface portion of said window member coextends with and is fused to a substantial surface area portion of said body member, said body member is a columnar member having an opening aligned with said window portion, and the outer surface of said body member is covered with said window member.

* * * * *